US010019319B2

(12) United States Patent
Huang

(10) Patent No.: US 10,019,319 B2
(45) Date of Patent: Jul. 10, 2018

(54) ELECTRONIC DEVICE AND STORAGE INITIALIZATION METHOD

(71) Applicant: NANNING FUGUI PRECISION INDUSTRIAL CO. LTD., Nanning (CN)

(72) Inventor: Yi-Sheng Huang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 26 days.

(21) Appl. No.: 15/153,746

(22) Filed: May 13, 2016

(65) Prior Publication Data

US 2017/0060692 A1  Mar. 2, 2017

(30) Foreign Application Priority Data

Aug. 24, 2015 (TW) .............................. 104127524 A

(51) Int. Cl.
*G06F 11/14* (2006.01)
*G06F 3/06* (2006.01)
*G06F 9/4401* (2018.01)

(52) U.S. Cl.
CPC .......... *G06F 11/142* (2013.01); *G06F 3/0619* (2013.01); *G06F 3/0653* (2013.01); *G06F 3/0688* (2013.01); *G06F 9/4411* (2013.01); *G06F 2201/805* (2013.01); *G06F 2201/85* (2013.01)

(58) Field of Classification Search
CPC .... G06F 11/142; G06F 3/0619; G06F 3/0653; G06F 3/0688; G06F 11/2273; G06F 11/2284; G06F 11/3428
See application file for complete search history.

(56) References Cited

U.S. PATENT DOCUMENTS

| 7,096,349 | B1 * | 8/2006 | Hamilton | G06F 13/1694 711/167 |
| 7,392,372 | B2 * | 6/2008 | Chu | G06F 9/4403 713/1 |
| 7,495,973 | B2 * | 2/2009 | Jung | G11C 7/22 365/194 |
| 8,060,785 | B2 * | 11/2011 | Lin | G11C 29/028 713/1 |
| 8,595,597 | B2 * | 11/2013 | Xie | G06F 11/1048 714/708 |
| 9,349,476 | B2 * | 5/2016 | Pe'er | G11C 16/3418 |

(Continued)

FOREIGN PATENT DOCUMENTS

TW  200519595 A  6/2005
TW  201511023 A  3/2015

*Primary Examiner* — Elmira Mehrmanesh
(74) *Attorney, Agent, or Firm* — ScienBiziP, P.C.

(57) ABSTRACT

An electronic device able to re-initialize following a failed initialization has a processor, a first storage device, and a second storage device. The processor receives storage information stored at the first storage device and sets a plurality of storage parameters of the first storage device, according to the storage information, and re-initializing the first storage device based on the storage parameters. When the initialization fails, the processor adjusts the storage parameters of the first storage device and re-initializes the first storage device based on the adjusted storage parameters.

11 Claims, 3 Drawing Sheets

(56) References Cited

U.S. PATENT DOCUMENTS

| | | | |
|---|---|---|---|
| 2005/0073929 A1* | 4/2005 | Mutou | G11B 20/1816 369/53.35 |
| 2006/0156171 A1 | 7/2006 | Kuznetsov et al. | |
| 2006/0288198 A1* | 12/2006 | Shih | G06F 11/1417 713/1 |
| 2008/0148129 A1 | 6/2008 | Moon et al. | |
| 2008/0159094 A1* | 7/2008 | Lin | G11B 7/00458 369/44.32 |
| 2009/0077436 A1* | 3/2009 | Lo | G11C 7/1045 714/718 |
| 2010/0070690 A1* | 3/2010 | Amer | G11C 7/1051 711/103 |
| 2010/0082967 A1* | 4/2010 | Lo | G11C 5/04 713/2 |
| 2013/0268712 A1* | 10/2013 | Ajanovic | G06F 13/124 710/310 |
| 2014/0164823 A1* | 6/2014 | Zheng | G06F 11/2053 714/6.11 |
| 2015/0046642 A1* | 2/2015 | Lee | G06F 13/14 711/105 |
| 2015/0074359 A1* | 3/2015 | Sunagawa | G06F 13/18 711/158 |

* cited by examiner

ELECTRONIC DEVICE AND STORAGE INITIALIZATION METHOD

CROSS-REFERENCE TO RELATED APPLICATIONS

This application claims priority to Taiwanese Patent Application No. 104127524 filed on Aug. 24, 2015, the contents of which are incorporated by reference herein.

FIELD

The subject matter herein generally relates to memory dynamics.

BACKGROUND

When an initialization of a memory in an electronic device fails during booting, an operating system of the electronic device cannot operate normally, even though the electronic device can provide an alert for the failed initialization.

BRIEF DESCRIPTION OF THE DRAWINGS

Implementations of the present technology will now be described, by way of example only, with reference to the attached figures.

DETAILED DESCRIPTION

Figure 1:
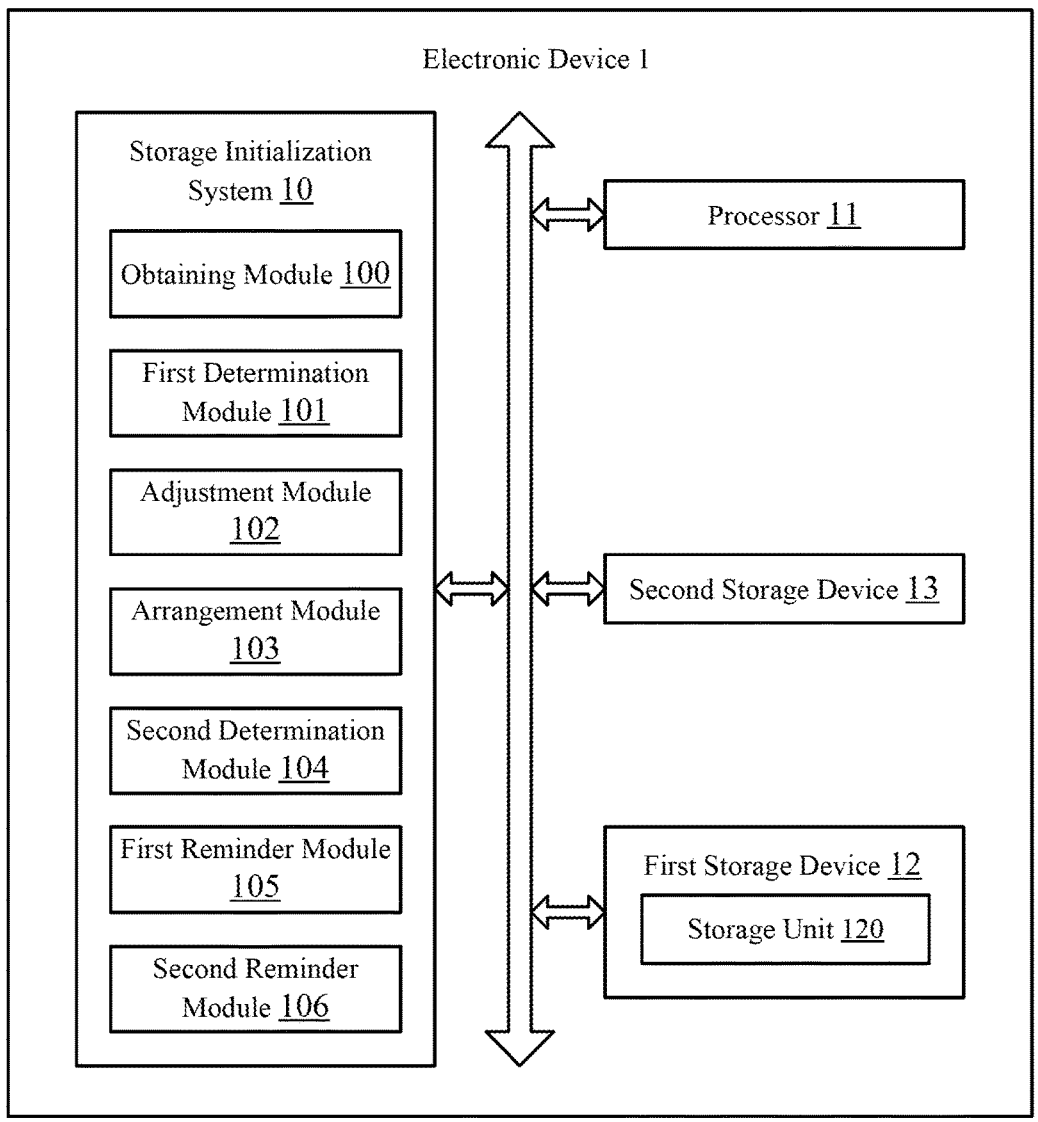
FIG. 1 is a block diagram of one embodiment of an electronic device including a function control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of an electronic device 1 including a storage initialization system 10. In the embodiment, the electronic device 1 can include a processor 11, a first storage device 12, and a second storage device 13. The processor 11 can be coupled to the first storage device 12 and the second storage device 13 via a system bus. The first storage device 12 includes a storage unit 120 storing storage information. The second storage device 13 can store a plurality of instructions. When the plurality of instructions are executed by the processor 11, the processor 11 receives the storage information from the storage unit 120 to set a plurality of storage parameters of the first storage device 12 according to the storage information. Then, the processor 11 initializes the first storage device 12 based on the storage parameters. When an initialization of the first storage device 12 fails, the processor 11 can adjust the storage parameters of the first storage device 12 and re-initialize the first storage device 12 based on the adjustments.

In at least one embodiment, the processor 11 determines whether the initialization of the first storage device 12 has failed or not. When the initialization of the first storage device 12 fails, the processor 11 can adjust the storage parameters.

In at least one embodiment, the processor 11 can determine whether or not all of the storage reading parameters are equal to the maximum values of the storage reading parameters, or whether all of the storage writing parameters are equal to the maximum values of the storage writing parameters. The processor 11 can re-initialize the first storage device based on the adjusted storage parameters when one of the adjusted storage reading parameters is lower than a predetermined maximum reading parameter and one of the adjusted storage writing parameters is lower than a predetermined maximum writing parameter.

In at least one embodiment, the processor 11 can determine whether current frequency of the first storage device 12 is higher than a minimum frequency of the first storage device 12 when all of the adjusted storage parameters are equal to the predetermined maximum reading parameters or when all of the adjusted storage writing parameters are equal to the predetermined maximum writing parameters. When the current frequency is determined as being higher than the minimum, the processor 11 can decrease the storage frequency of the first storage device 12, reset the storage reading parameters and the storage writing parameters to be equal to predetermined parameters, and re-initialize the first storage device 12.

In at least one embodiment, the processor 11 can perform an operation test for the first storage device 12 when the initialization of the first storage device 12 is successful. The processor 11 can provide a first reminder to the electronic device 1 when the operation test of the storage device fails.

In at least one embodiment, the processor 11 can determine whether the storage parameters have been adjusted when the operation test of the storage first storage 12 passes. When the storage parameters have been adjusted, the processor 11 can provide a second reminder to the electronic device 1.

The processor 11 can be a central processor (CPU), a graphic processor (GPU), a system on chip (SoC), a field-programmable gate array (FPGA), a processing unit of basic input output system (BIOS), or a controller for executing the program instructions in the second storage device 13 which can be static RAM (SRAM), dynamic RAM (DRAM), EPROM, EEPROM, flash memory, or other types of computer memory. The processor 11 can further include or comprise an embedded system or an application specific integrated circuit (ASIC) having embedded program instructions.

The first storage device 12 can be a memory device such as random-access memory (RAM), or synchronous dynamic RAM (SDRAM), or other forms of electronic, or electromagnetic, memory device. The storage unit 120 of the first storage device 12 can be a read-only memory (ROM), such as electrically erasable programmable ROM (EEPROM). The storage information stored in the storage unit 120 can include serial presence detect (SPD) data. The SPD data can include storage information of the first storage device 12. The processor 11 can receive the storage information of the SPD data through BIOS to initialize the first storage device 12. The storage information can include frequency, voltage level, numbers of row address bits and column address bits, bit width, and other types of computer memory parameters.

In at least one embodiment, the storage information includes frequency, storage reading parameters, and storage writing parameters of the first storage device 12. The storage reading parameters can include row precharge time (tRP), row address (RAS) to column address (CAS) delay (tRCD), RAS active time (tRAS), and CAS latency (tCL). The storage writing parameters can include tRP, tRCD, CAS write latency (tCWL), and write recovery time (tWR). The SPD data can include selectable ranges of frequency and tCL. The selectable range of the frequency can be an interval, such as 100 MHZ≤Freq≤120 MHZ. The tCL can be measured based on the number of clock period times (tCK) and the selectable range of the tCL can be a set, such as $A_{tCL}=\{3, 4, 5, 6, 7, 8\}$. The SPD can further include the minimum tRP (tRP(min)), the minimum tRCD (tRCD (min)), the minimum tRAS (tRAS(min)), the minimum tCWL (tCWL(min)), and the minimum tWR (tWR(min)).

The second storage device 13 can be a non-volatile computer readable storage medium that can be electrically erased and reprogrammed, such as read-only memory (ROM), random-access memory (RAM), erasable programmable ROM (EPROM), electrically EPROM (EEPROM), hard disk, solid state drive, or other forms of electronic, electromagnetic, or optical recording medium. In at least one embodiment, the second storage device 13 can include interfaces that can access the aforementioned computer readable storage medium to enable the electronic device 1 to connect to and access such computer readable storage medium. In at least one embodiment, the second storage device 13 can be a smart media card, a secure digital card, or a flash card.

In at least one embodiment, the electronic device 1 can be a mobile phone, a tablet, or other electronic device. FIG. 1 illustrates only one example of an electronic device 1, the electronic device 1 in other embodiments can include more or fewer components than as illustrated, or have a different configuration of the various components.

In at least one embodiment, the storage initialization system 10 can include one or more modules, for example, an obtaining module 100, a first determination module 101, an adjustment module 102, an arrangement module 103, a second determination module 104, a first reminder module 105, and a second reminder module 106. "Module," as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable medium include CDs, DVDs, BLU-RAY, flash memory, and hard disk drives.

The obtaining module 100 receives storage information from the first storage device 12, and sets the storage parameters of the first storage device 12 based on the storage information. The first determination module 101 initializes the first storage device 12 and determines a failure or a non-failure in the initialization of the first storage device 12. The adjustment module 102 adjusts the storage parameters of the first storage device 12 when the initialization of the first storage device 12 fails. The arrangement module 103 sets the storage parameters of the first storage device 12 based on the adjusted storage parameters The second determination module 104 can perform an operation test for the first storage device 12 when the initialization of the first storage device does not fail. The first reminder module 105 provides a first reminder for a failed initialization. The second reminder module 106 provides a second reminder for the adjusted parameters.

Figure 2:
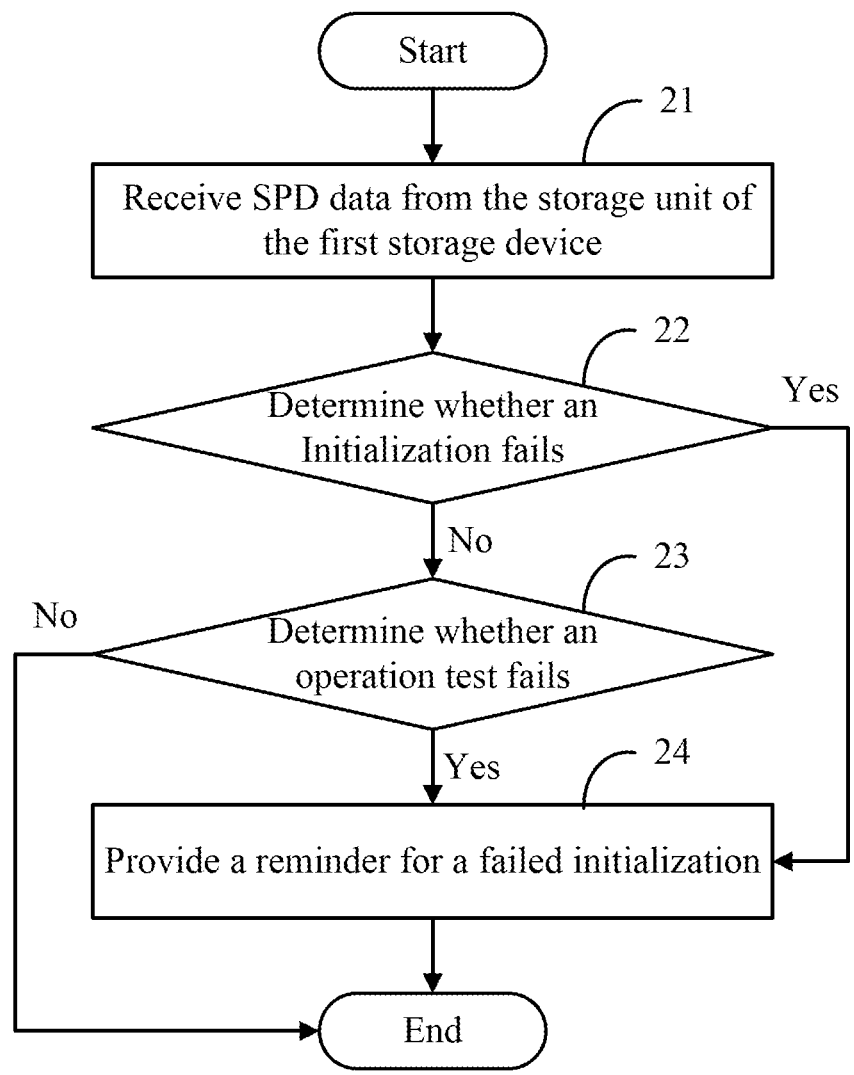
FIG. 2 illustrates a flowchart of one embodiment of an initialization method for the electronic device of FIG. 2.

FIG. 2 illustrates a flowchart in accordance with an example embodiment. The example method is provided by way of example, as there are a variety of ways to carry out the method. The method described below can be carried out using the configuration illustrated in FIG. 1, for example, and various elements of these figures are referenced in explaining example method. Each block shown in FIG. 2 represents one or more processes, methods, or subroutines, carried out in the example method. Furthermore, the order of blocks is illustrative only and can change. Additional blocks can be added or fewer blocks can be utilized without departing from this disclosure. The example method can begin at block 21.

At block 21, the obtaining module 100 receives SPD data from the storage unit 120 of the first storage device 12, and sets the operating parameters of the first storage device 12 based on the storage information within the SPD data.

At block 22, the first determination module 101 initializes the first storage device 12 and determines whether the initialization of the first storage device 12 has failed or not failed. If the initialization of the first storage device 12 has not failed, the procedure goes to block 23. If the initialization of the first storage device 12 has failed, the procedure goes to block 24.

In at least one embodiment, the first determination module 101 can determine a failure or non-failure of the initialization through a first reading test and a first writing test of the BIOS. If the first reading test and the first writing test of the BIOS for the first storage device 12 pass, the first determination module 101 can determine that the initialization of the first storage device 12 has not failed.

At block 23, the second determination module 104 can perform an operation test for the first storage device 12, and determine whether the operation test of the first storage device 12 has failed or not. If the operation test of the first storage device 12 has failed, the procedure goes to block 24. If the operation test of the first storage device 12 passes, the procedure ends.

At block 24, the first reminder module 105 provides a reminder that the initialization of the first storage device 12 has failed by a predetermined signal. The predetermined signal can be an audible signal via a speaker, for example a long beep and a short beep.

Figure 3:
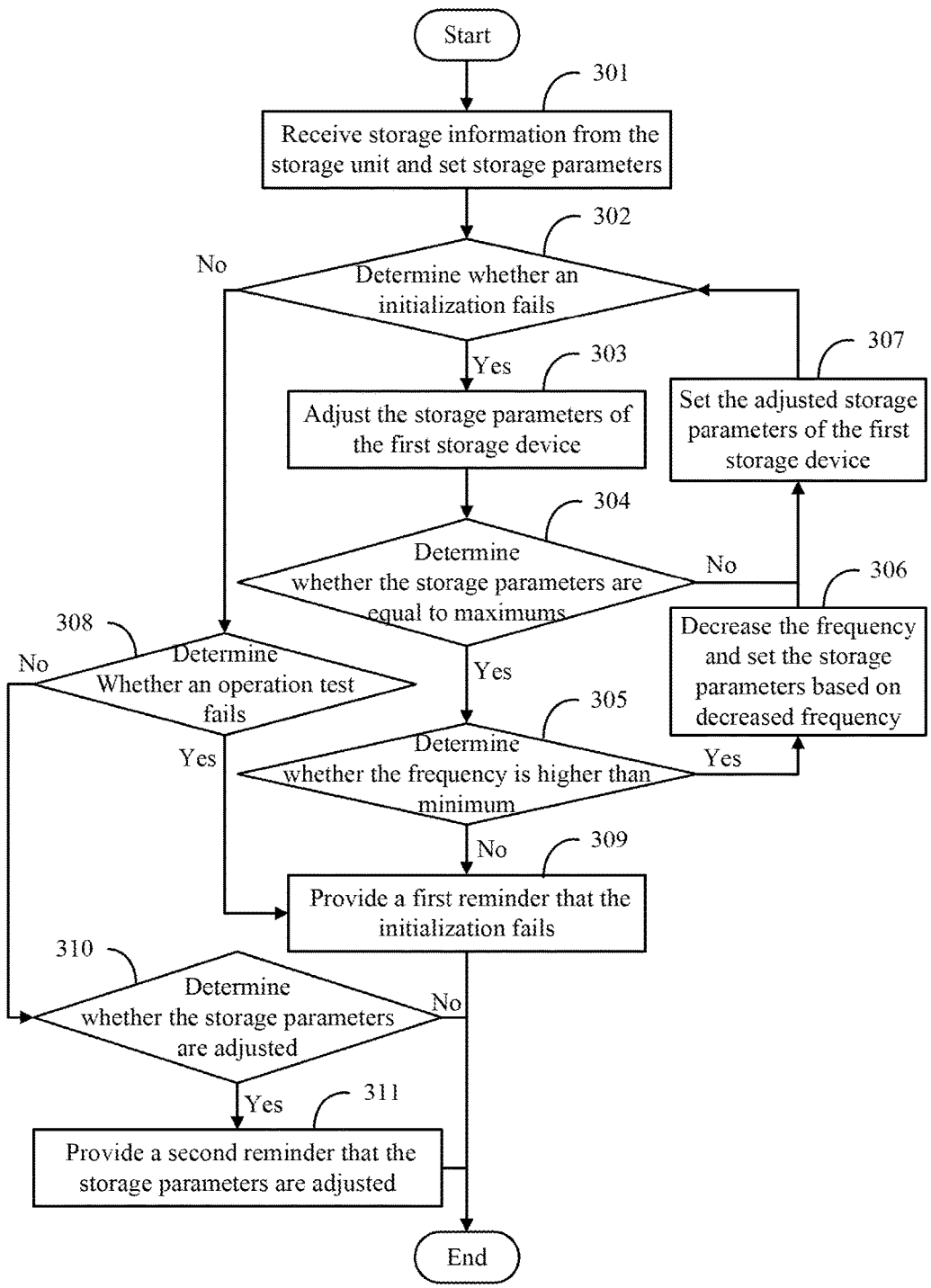
FIG. 3 illustrates a flowchart of one embodiment of an initialization method for the electronic device of FIG. 2.

FIG. 3 illustrates a flowchart in accordance with an example embodiment. The example method is provided by way of example, as there are a variety of ways to carry out the method. The method described below can be carried out using the configuration illustrated in FIG. 1, for example, and various elements of these figures are referenced in explaining example method. Each block shown in FIG. 3 represents one or more processes, methods, or subroutines, carried out in the example method. Furthermore, the order of blocks is illustrative only and can change. Additional blocks can be added or fewer blocks can be utilized, without departing from this disclosure. The example method can begin at block 301.

At block 301, the obtaining module 100 receives storage information from the storage unit 120 of the first storage device 12, and sets storage parameters of the first storage device 12 based on the storage information.

When the obtaining module 100 receives the storage information from the storage unit 120, the obtaining module 100 determines selectable ranges for frequency, storage parameters of the first storage device 12 according to the storage information. The storage parameters of the first storage device 12 including storage reading parameters and storage writing parameters can be set according to the selectable ranges. In at least one embodiment, the selectable ranges of the frequency and tCL of the first storage device 12 can be directly obtained from the storage information. In at least one embodiment, the selectable ranges of tRP, tRCD, tRAS, tCWL, and tWR can be obtained by the following relations:

$tRP(\min) < tRP < tRP(\max) = N*tRP(\min),$ $tRCD(\min) < tRCD < tRCD(\max) = N*tRCD(\min),$ $tRAS(\min) < tRAS < tRAS(\max) = N*tRAS(\min),$ $tCWL(\min) < tCWL < tCWL(\max) = N*tCWL(\min),$ $tWR(\min) < tWR < tWR(\max) = N*tWR(\min)$ wherein tRP(min), tRCD(min), tRAS(min), tCWL(min), and tWR(min) are the respective minimums of tRP, tRCD, tRAS, tCWL, and tWR. The tRP(max), tRCD(max), tRAS(max), tCWL(max), and tWR(max) are the respective maximums of tRP, tRCD, tRAS, tCWL, and tWR. N is an integer set to be more than or equal to two. The storage information includes tRP(min), tRCD(min), tRAS(min), tCWL(min), and tWR(min).

At block 302, the first determination module 101 initializes the first storage device 12 and determines whether the initialization of the first storage device 12 has failed or not. If the initialization of the first storage device 12 has failed, the procedure goes to block 303. If the initialization of the first storage device 12 does not fail, the procedure goes to block 308. The first determination module 101 can determine a failure or non-failure of the initialization through a first reading test and a first writing test.

In at least one embodiment, the first determination module 101 can first perform the first reading test for the first storage device 12. When the first reading test passes, the first determination module 101 can perform the first writing test for the first storage device 12. When both of the first reading test and the first writing test pass, the first determination module 101 determines that the initialization of the first storage device 12 has not failed. When the first reading test fails, the first determination module 101 determines that the initialization of the first storage device 12 has failed. When the first reading test passes and the first writing test fails, the first determination module 101 determines that the initialization of the first storage device 12 has failed.

At block 303, the adjustment module 102 adjusts the storage parameters of the first storage device 12.

In at least one embodiment, the priority of the storage parameters to be adjusted can be determined based on a first priority of the storage reading parameters and a second priority of the storage writing parameters. The first priority is determined according to a first ratio of each of the storage reading parameters to a first summation of the storage reading parameters, and the second priority is determined according to a second ratio of each of the storage writing parameters to a second summation of the storage writing parameters. The adjustment module 102 can first adjust the one of storage reading parameters which has a higher first ratio, and first adjust the one of storage writing parameters which has a higher second ratio.

In at least one embodiment, when the first reading test fails, the adjustment module 102 can adjust the storage reading parameters based on the following formulas:

$\text{Freq}(\text{now}) = 1/tCK(\text{now}),$ $tCL(\text{Init}) = \text{Ceiling}(tCL(\min)/tCK(\text{now})),$ $tRP(\text{Init}) = \text{Ceiling}(tRP(\min)/tCK(\text{now})),$ $tRCD(\text{Init}) = \text{Ceiling}(tRCD(\min)/tCK(\text{now})),$ $tRAS(\text{Init}) = \text{Ceiling}(tRAS(\min)/tCK(\text{now})),$ $\Delta tR1 = tRP/(tCL + tRP + tRCD),$ $\Delta tR2 = tRCD/(tCL + tRP + tRCD),$ $\Delta tR3 = tCL/(tCL + tRP + tRCD),$ $\Delta tR4 = \Delta tR1 + \Delta tR2 + \Delta tR3,$ $tCL = tCL(\text{Init}) + \text{Floor}(Nr*\Delta tR3),$ $tRP = tRP(\text{Init}) + \text{Floor}(Nr*\Delta tR1),$ $tRCD = tRCD(\text{Init}) + \text{Floor}(Nr*\Delta tR2),$ $tRAS = tRCD(\text{Init}) + \Delta tR4,$ wherein tCK(now) is the current clock period time, and tCL(Init), tRP(Init), tRCD(Init), and tRAS(Init) are predetermined respective values of tCL, tRP, tRCD, and tRAS. The $\Delta tR1$, $\Delta tR2$, and $\Delta tR3$ are the first ratios of each storage reading parameter to the first summation of the storage reading parameters. The ceiling function Ceiling( ) maps a real number to the smallest following integer, and the floor function Floor( ) maps a real number to the largest previous integer. Nr is the number of the first reading test determined as being a failed test.

In at least one embodiment, when the first reading test passes and the first writing test fails, the adjustment module 102 can adjust the storage writing parameters. Before the adjustment module 102 adjusts the storage parameters, the adjustment module 102 can determine whether tCWL is higher than or equal to tCL. If tCWL is higher than or equal to tCL, the adjustment module 102 can adjust tCWL based only on the following formulas:

$\text{Freq}(\text{now}) = 1/tCK(\text{now}),$ $tCWL(\text{Init}) = \text{Ceiling}(tCWL(\min)/tCK(\text{now})),$ $\Delta tW3 = tCWL/(tRP + tRCD + tWR + tCWL),$ $tCWL = tCWL(\text{Init}) + \text{Floor}(Nw*\Delta tW3).$ If tCWL is lower than tCL, the adjustment module 102 can adjust the storage writing parameters based on the following formulas:

$\text{Freq}(\text{now}) = 1/tCK(\text{now}),$ $tRP(\text{Init}) = \text{Ceiling}(tRP(\min)/tCK(\text{now})),$ $tRCD(\text{Init})=\text{Ceiling}(tRCD(\min)/tCK(\text{now}))$, $tCWL(\text{Init})=\text{Ceiling}(tCWL(\min)/tCK(\text{now}))$, $tWR(\text{Init})=\text{Ceiling}(tWR(\min)/tCK(\text{now}))$, $\Delta tW1=tRP/(tRP+tRCD+tWR+tCWL)$, $\Delta tW2=tRCD/(tRP+tRCD+tWR+tCWL)$, $\Delta tW3=tCWL/(tRP+tRCD+tWR+tCWL)$, $\Delta tW4=tWR/(tRP+tRCD+tWR+tCWL)$, $tCWL=tCWL(\text{Init})+\text{Floor}(Nw*\Delta tW3)$, $tRP=tRP(\text{Init})+\text{Floor}((Nw-(tCWL-tCWL(\text{Init})))*\Delta tw1)$, $tRCD=tRCD(\text{Init})+\text{Floor}(Nw*\Delta tW2)$, $tWR=tWR(\text{Init})+\text{Floor}(Nw*\Delta tW4)$, wherein tCK(now) is the current clock period time, and tRP(Init), tRCD(Init), tCWL(Init), and tWR(Init) are predetermined respective values of tRP, tRCD, tCWL, and tWR. The ΔtW1, ΔtW2, ΔtW3 and ΔtW4 are the second ratios of each storage writing parameter to the second summation of the storage writing parameters. The ceiling function Ceiling( ) maps a real number to the smallest following integer, and the floor function Floor( ) maps a real number to the largest previous integer. Nw is the number of the first writing test determined as being a failed test.

In at least one embodiment, when a storage parameter is adjusted to be higher than the maximum of the storage parameter, the adjustment module 102 can reset the storage parameter to be equal to the maximum of the storage parameter. For example, if the maximum tRP is equal to 7, the adjustment module 102 can set tRP to be equal to 7 when tRP is adjusted to be higher than 7. In addition, the adjustment module 102 counts the number of times that the first reading test or the first writing test fails, so the adjustment module 102 can obtain Nw and Nr.

At block 304, the adjustment module 102 can determine whether or not all of the storage reading parameters are equal to the maximum of each storage reading parameter, or whether all of the storage writing parameters are equal to the maximum of each storage writing parameter. If all of the storage reading parameters are equal to the maximum of each storage reading parameter or all of the storage writing parameters are equal to the maximum of each storage writing parameter, the procedure goes to block 305. If one of the storage reading parameters is not equal to its maximum or one of the storage writing parameters is not equal to its maximum, the procedure goes to block 307.

In at least one embodiment, when the adjustment module adjusts the storage reading parameters, the adjustment module 102 determines whether or not all of the storage reading parameters are equal to the maximum of each storage reading parameter. When the adjustment module adjusts the storage writing parameters, the adjustment module 102 determines whether or not all of the storage writing parameters are equal to the maximum of each storage writing parameter. If all the storage reading parameters are equal to the maximum of each storage reading parameter, the procedure goes to block 305, even if all the storage writing parameters are not equal to the maximum of each storage writing parameter.

At block 305, the adjustment module 102 can determine whether the current frequency of the first storage device 12 is higher than the minimum frequency of the first storage device 12. If the current frequency of the first storage device 12 is higher than the minimum frequency of the first storage device 12, the procedure goes to block 306. If the current frequency of the first storage device 12 is lower than or equal to the minimum frequency of the first storage device 12, the storage parameters will not be adjusted and the procedure goes to block 309.

At block 306, the adjustment module 102 can decrease the frequency of the first storage device 12 and set the storage reading parameters and the storage writing parameters so as to be equal to the predetermined parameters. In at least one embodiment, the adjustment module 102 can decrease the frequency by a fixed value, such as 1 MHz. In at least one embodiment, the adjustment module 102 can decrease the frequency based on a predetermined rule.

In at least one embodiment, the adjustment module 102 sets the storage reading parameters and the storage writing parameters as the predetermined parameters based on the following formulas:

$tCL=tCL(\text{Init})=\text{Ceiling}(tCL(\min)/tCK(\text{now}))$, $tRP=tRP(\text{Init})=\text{Ceiling}(tRP(\min)/tCK(\text{now}))$, $tRP=tRCD(\text{Init})=\text{Ceiling}(tRCD(\min)/tCK(\text{now}))$, $tRAS=tRAS(\text{Init})=\text{Ceiling}(tRAS(\min)/tCK(\text{now}))$, $tCWL=tCWL(\text{Init})=\text{Ceiling}(tCWL(\min)/tCK(\text{now}))$, $tWR=tWR(\text{Init})=\text{Ceiling}(tWR(\min)/tCK(\text{now}))$.

At block 307, the arrangement module 103 can set the storage parameters of the first storage device 12 based on the adjusted storage parameters, and then the procedure goes back to block 302. Thus, the first determination module 101 can re-initialize the first storage device 12. In at least one embodiment, the arrangement module 103 can store the adjustment values of the storage parameters of the first storage device 12 from the adjustment module 102.

At block 308, the second determination module 104 can perform an operation test for the first storage device 12 when an initialization of the first storage device 12 does not fail. The second determination module 101 can determine whether the operation test of the first storage device 12 has failed or not. If the operation test of the first storage device 12 is a fail, the procedure goes to block 309. If the operation test of the first storage device 12 passes, the procedure goes to block 310.

In at least one embodiment, the second determination module 104 performs a second reading test and a second writing test for the initialized first storage device 12, and determines whether or not the second reading test and the second writing test of the initialized first storage device 12 fail. If one of the second reading test and the second writing test of the first storage device 12 fails, the procedure goes to block 309. If both of the second reading test and the second writing test of the first storage device 12 pass, the procedure goes to block 310.

At block 309, the first reminder module 105 provides a first reminder to the electronic device 1, by a first predetermined signal, that the initialization of the first storage device 12 fails. In at least one embodiment, the first predetermined signal can be a first audible signal via a speaker. The first audible signal can be a long beep and a short beep.

At block 310, the second reminder module 106 determines whether or not the storage parameters are adjusted. If the storage parameters of the first storage device 12 are not to be adjusted, the procedure ends. If the storage parameters of the first storage device 12 are adjusted, the procedure goes to block 311.

At block 311, the second reminder module 106 provides a second reminder to the electronic device 1, by a second predetermined signal, that the storage parameters of the first storage device 12 are adjusted. Thus, the electronic device 1 can obtain the adjustment, such as an increased frequency or an amended tRP, from the second reminder module 106.

In at least one embodiment, the number of blocks in FIG. 3 can be decreased, for example blocks 301-309 can be utilized without loss of efficacy. In at least one embodiment the first predetermined signal and the second predetermined signal can be audible or visual signal(s). When the first predetermined signal is audible, the BIOS can initialize an audio device, such as an audio card, before the procedure goes to block 309. The audio card can provide the audible signal through the speaker. When the first predetermined signal is visual, the BIOS can initialize a display device, such as a display card, before the procedure goes to block 309. The display card can provide the visual signal through a display. When the second predetermined signal is audible signal, the BIOS can initialize an audio device, such as an audio card, before the procedure goes to block 311. When the second predetermined signal is a visual signal, the BIOS can initialize a display device before the procedure goes to block 311.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. An electronic device, comprising:
a processor;
a first storage device coupled to the processor; and
a second storage device coupled to the processor and storing a plurality of instructions, when executed by the processor, causes the processor to:
receive storage information stored at the first storage device;
set a plurality of storage reading parameters and a plurality of storage writing parameters of the first storage device according to the storage information, wherein the storage reading parameters comprises row precharge time (tRP), row address (RAS) to column address (CAS) delay (tRCD), RAS active time (tRAS), and CAS latency (tCL), and the storage writing parameters comprises tRP, tRCD, CAS write latency (tCWL), and write recovery time (tWR) according to the storage information;
initialize the first storage device based on the plurality of storage reading parameters and the plurality of storage writing parameters;
adjust the plurality of storage reading parameters and/or the plurality of storage writing parameters when the initialization of the first storage device fails;
determine whether the adjusted storage reading parameters are equal to predetermined maximum reading parameters;
determine whether the adjusted storage writing parameters are equal to predetermined maximum writing parameters; and
initialize the first storage device based on the adjusted storage parameters when one of the adjusted storage reading parameters is lower than the predetermined maximum reading parameter or one of the adjusted storage writing parameters is lower than the predetermined maximum writing parameter;
wherein the initialization of the first storage device comprises a first reading test and a first writing test, further comprising instructions which when executed by the processor cause the processor to:
adjust the storage reading parameters based on the following formulas:

$$\text{Freq}(\text{now})=1/tCK(\text{now}),$$

$$tCL(\text{Init})=\text{Ceiling}(tCL(\min)/tCK(\text{now})),$$

$$tRP(\text{Init})=\text{Ceiling}(tRP(\min)/tCK(\text{now})),$$

$$tRCD(\text{Init})=\text{Ceiling}(tRCD(\min)/tCK(\text{now})),$$

$$tRAS(\text{Init})=\text{Ceiling}(tRAS(\min)/tCK(\text{now})),$$

$$\Delta tR1=tRP/(tCL+tRP+tRCD),$$

$$\Delta tR2=tRCD/(tCL+tRP+tRCD),$$

$$\Delta tR3=tCL/(tCL+tRP+tRCD),$$

$$\Delta tR4=\Delta tR1+\Delta tR2+\Delta tR3,$$

$$tCL=tCL(\text{Init})+\text{Floor}(Nr*\Delta tR3),$$

$$tRP=tRP(\text{Init})+\text{Floor}(Nr*\Delta tR1),$$

$$tRCD=tRCD(\text{Init})+\text{Floor}(Nr*\Delta tR2),$$

$$tRAS=tRCD(\text{Init})+\Delta tR4,$$

wherein tCK(now) is a current clock period time, and tCL(Init), tRP(Init), tRCD(Init), and tRAS(Init) comprised in serial presence detect (SPD) data are predetermined respective values of tCL, tRP, tRCD, and tRAS, the ΔtR1, ΔtR2, and ΔtR3 are a first ratios of each storage reading parameter to a first summation of the storage reading parameters, the ceiling function Ceiling( ) maps a real number to the smallest following integer, and the floor function Floor( ) maps a real number to the largest previous integer, Nr is a number of the first reading test determined as being a failed test.

2. The electronic device according to claim 1, wherein the first storage device is an electrically-erasable programmable read-only memory.

3. The electronic device according to claim 1, further comprising instructions which when executed by the processor cause the processor to:
determine whether a storage frequency of the first storage device is higher than a predetermined minimum frequency when the adjusted storage reading parameters are equal to the predetermined maximum reading parameters or when the adjusted storage writing parameters are equal to the predetermined maximum writing parameters; and
decrease the storage frequency of the first storage device in response to the storage frequency of the first storage device being higher than a predetermined minimum frequency.

4. The electronic device according to claim 1, wherein a first priority of one of the storage reading parameters to be adjusted is determined according to a first ratio of the one of the storage reading parameters to a first summation of the plurality of storage reading parameters, and a second priority of one of the storage writing parameters to be adjusted is determined according to a second ratio of the one of the storage writing parameters to a second summation of the plurality of storage writing parameters.

5. The electronic device according to claim 1, further comprising instructions which when executed by the processor cause the processor to:
   perform an operation test for the first storage device when the first storage device is initialized; and
   provide a first reminder to the electronic device when the operation test of the first storage device fails.

6. The electronic device according to claim 5, further comprising instructions which when executed by the processor cause the processor to:
   determine whether the plurality of storage parameters have been adjusted when the operation test of the storage device passes; and
   provide a second reminder to the electronic device when the plurality of storage parameters have been adjusted.

7. A method for initializing a storage device of an electronic device, the method comprising:
   receiving storage information in the storage device;
   setting a plurality of storage reading parameters and a plurality of storage writing parameters of the storage device according to the storage information, wherein the storage reading parameters comprises row precharge time (tRP), row address (RAS) to column address (CAS) delay (tRCD), RAS active time (tRAS), and CAS latency (tCL), and the storage writing parameters comprises tRP, tRCD, CAS write latency (tCWL), and write recovery time (tWR) according to the storage information;
   initializing the storage device based on the plurality of storage reading parameters and the plurality of storage writing parameters;
   adjusting the plurality of storage reading parameters and/or the plurality of storage writing parameters when the initialization of the storage device fails;
   determining whether the adjusted storage reading parameters are equal to predetermined maximum reading parameters;
   determining whether the adjusted storage writing parameters are equal to predetermined maximum writing parameters; and
   initializing the storage device based on the adjusted storage parameters when one of the adjusted storage reading parameters is lower than the predetermined maximum reading parameter or one of the adjusted storage writing parameters is lower than the predetermined maximum writing parameter;
   wherein the initialization of the storage device comprises a first reading test and a first writing test, further comprising:
   adjusting the storage reading parameters based on the following formulas:

$Freq(now)=1/tCK(now)$, $tCL(Init)=Ceiling(tCL(min)/tCK(now))$, $tRP(Init)=Ceiling(tRP(min)/tCK(now))$, $tRCD(Init)=Ceiling(tRCD(min)/tCK(now))$, $tRAS(Init)=Ceiling(tRAS(min)/tCK(now))$, $\Delta tR1=tRP/(tCL+tRP+tRCD)$, $\Delta tR2=tRCD/(tCL+tRP+tRCD)$, $\Delta tR3=tCL/(tCL+tRP+tRCD)$, $\Delta tR4=\Delta tR1+\Delta tR2+\Delta tR3$, $tCL=tCL(Init)+Floor(Nr*\Delta tR3)$, $tRP=tRP(Init)+Floor(Nr*\Delta tR1)$, $tRCD=tRCD(Init)+Floor(Nr*\Delta tR2)$, $tRAS=tRCD(Init)+\Delta tR4$, wherein tCK(now) is a current clock period time, and tCL(Init), tRP(Init), tRCD(Init), and tRAS(Init) comprised in serial presence detect (SPD) data are predetermined respective values of tCL, tRP, tRCD, and tRAS, the $\Delta tR1$, $\Delta tR2$, and $\Delta tR3$ are a first ratios of each storage reading parameter to a first summation of the storage reading parameters, the ceiling function Ceiling( ) maps a real number to the smallest following integer, and the floor function Floor( ) maps a real number to the largest previous integer, Nr is a number of the first reading test determined as being a failed test.

8. The method according to claim 7, further comprising:
   determining whether a storage frequency of the storage device is higher than a predetermined minimum frequency when the adjusted reading storage parameters are equal to the predetermined maximum reading parameters or when the adjusted storage writing parameters are equal to the predetermined maximum writing parameters; and
   decreasing the storage frequency of the storage device in response to the storage frequency of the storage device being higher than a predetermined minimum frequency.

9. The method according to claim 7, wherein a first priority of one of the storage reading parameters to be adjusted is determined according to a first ratio of the one of the storage reading parameters to a first summation of the plurality of storage reading parameters, and a second priority of one of the storage writing parameters to be adjusted is determined according to a second ratio of the one of the storage writing parameters to a second summation of the plurality of storage writing parameters.

10. The method according to claim 7, further comprising:
    performing an operation test for the storage device when the storage device is initialized; and
    providing a first reminder to the electronic device when the operation test of the storage device fails.

11. The method according to claim 10, further comprising:
    determining whether the plurality of storage parameters have been adjusted when the operation test of the storage device passes; and
    providing a second reminder to the electronic device when the plurality of storage parameters have been adjusted.

* * * * *